United States Patent [19]

Kowaguchi et al.

[11] Patent Number: 4,860,131
[45] Date of Patent: Aug. 22, 1989

[54] METHOD FOR RECORRECTING HEAD POSITION IN A DISK DRIVE

[75] Inventors: Toru Kowaguchi, Furukawa; Tooru Kaneko, Miyagi; Jun Ide; Tomoo Iizumi, both of Furukawa, all of Japan

[73] Assignee: Alps Electric Co., Ltd., Japan

[21] Appl. No.: 81,310

[22] Filed: Aug. 3, 1987

[30] Foreign Application Priority Data

Sep. 8, 1986 [JP]  Japan ................................ 61-211259

[51] Int. Cl.[4] .......................... G11B 5/55; G11B 21/08
[52] U.S. Cl. .................................... 360/78.14; 360/75; 360/78.01; 360/78.04
[58] Field of Search ................... 360/75, 78, 106, 109, 360/78.04, 78.08, 78.12, 78.13, 78.14; 318/685, 696; 364/32, 33, 41; 358/907

[56] References Cited
U.S. PATENT DOCUMENTS 3,956,766  5/1976  Hanson et al. .................... 360/78.13
4,086,636  4/1978  Cizmic et al. ......................... 360/75
4,395,742  7/1983  Ostroff .............................. 360/78.13

FOREIGN PATENT DOCUMENTS 0154085  9/1985  European Pat. Off. .

Primary Examiner—Aristotelis M. Psitos
Assistant Examiner—Steven R. Garland
Attorney, Agent, or Firm—Guy W. Shoup; Paul J. Winters; Norman R. Klivans

[57] ABSTRACT

A method of re-correcting the position of a head is used in a disk driving device including a zero track restoring arrangement for electrically detecting the zero track position on a magnetic disk, and including a track counter indicating the track position of the magnetic head. The method is configured to monitor the track number of the track counter and never fails to effect re-correction of the position of the head when the track number is "0" or "1".

2 Claims, 1 Drawing Sheet

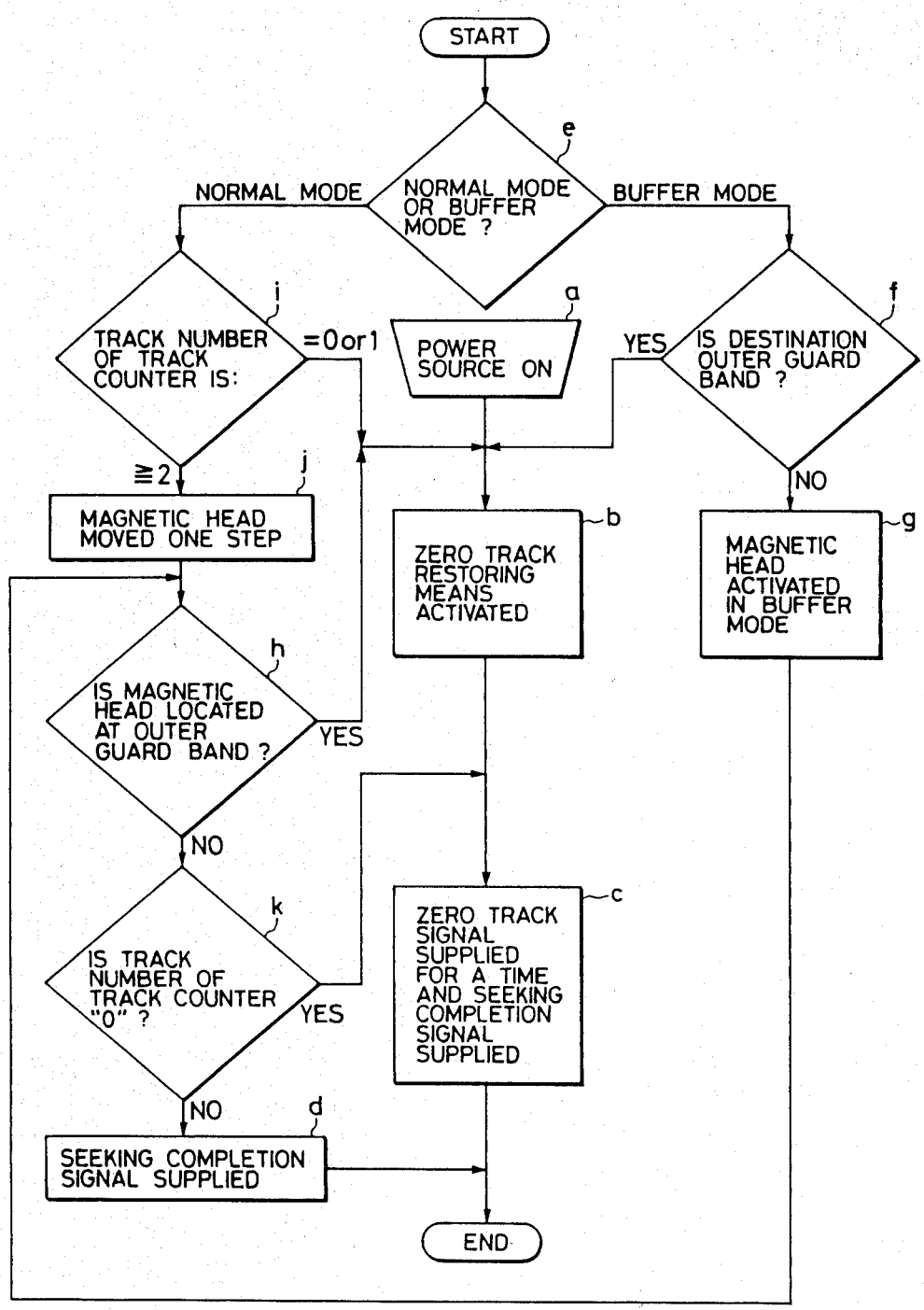

METHOD FOR RECORRECTING HEAD POSITION IN A DISK DRIVE

FIELD OF THE INVENTION

This invention relates to a method of re-correcting the position of a head in a disk drive device including an electrical detecting means for detection of the zero track.

BACKGROUND OF THE INVENTION

Among various known types of disk drive devices, those using hard type magnetic disks are widely used when a small dimension and a lot of information are required. Such a magnetic disk driving device has a speed of high revolution of a magnetic disk and a high density of information recording. Therefore, improved velocity and accuracy of the seeking motion (a motion of a head to go to a track to detect information regarding its own proper position to be taken in another track) are very important. The seeking is effected, using as a reference the zero track provided at the outermost circumference in a data zone on a magnetic disk. In this connection, detection of the zero track position must be accurate particularly.

A prior art arrangement of zero track position detecting mechanism includes a shutter which is formed on a carriage supporting a magnetic head thereon, and includes a photo interrupter which produces a detection signal when a light path is blocked by the shutter when the magnetic head approaches the zero track. A logical multiplication is obtained between the detection signal from the photo interrupter and a driving signal which excites a predetermined phase of a stepping motor for driving the carriage so as to cause a zero track signal to be produced, which signal indicates that the magnetic head is properly located at the zero track.

The mechanical detecting means described above requires the photo interrupter or other mechanical parts which prevent a desired reduction in size and thickness of the magnetic disk driving device, and cannot perform an expected operation in an increased recording density due to its limited accuracy of the zero track detection which depends on the resolving power of the photo interrupter.

To overcome these problems, one of the present inventors formerly proposed a zero track restoring method in which zero track detection is performed by an electrical detection means. According to the electrical detecting means, a servo zone provided on a magnetic disk in the form of a radially extending band is divided into two regions one of which is a first region in the rotationally upstream half and the other is a second region in the rotationally downstream half. In the data zone, servo information is written alternatingly in the first and second regions of the servo zone, whereas in the outer guard band, servo information is written in one of the first and second regions. Partition between the outer guard band and the data zone is roughly detected, based on a difference between the locations of the written servo information, and a driving signal for exciting a predetermined phase of the stepping motor is supplied to locate the magnetic head at a precise position on the zero track. That is, the zero track restoration is established.

Certainly, the aforegoing electrical detecting means does not require any mechanical part such as photo interrupter, facilitates a significant reduction of the size and thickness of the magnetic disk driving device, and has an improved resolving power of the detecting means.

Since the track position of the magnetic head is not known clearly when the power source of the magnetic disk drive device is switched on, zero track restoration is effected so as to meet a track number of a track counter with the track position of the magnetic head by once moving back the magnetic head to the zero track and resetting the track counter in a drive provided for controlling the position of the magnetic head. Zero track restoration is also effected when the magnetic head is moved by an external force and causes a seeking error in which the track position of the magnetic head does not coincide with the track number of the track counter. Further, zero track restoration is effected in a simple seeking motion to the zero track.

In case that zero track restoration is effected to cure a seeking error, the aforegoing prior art mechanical detecting means readily performs the zero track restoration to actually locate the magnetic head at a proper position on the zero track, referring to the track number of the track counter and the detection signal from the photo interrupter. However, the zero track restoring method using the electrical detecting means proposed by the present inventors and explained above cannot refer to a data such as the detection signal of the photo interrupter of the mechanical detecting means, and therefore must simply refer to the track number of the track counter. Therefore, if the track counter demonstrates track number "zero" even though the magnetic head is not actually located at the zero track, the drive itself makes an erroneous judgement that the zero track restoration is finished, resulting in detection of a zero track signal. In this case, re-correction of the head position is not effected even if a restoration signal is applied again.

A certain type of magnetic disk driving device is configured to judge presence or absence of a seeking error upon issuance of a zero track signal. In presence of any seeking error, the magnetic head is moved inwardly by an amount of several steps and subsequently moved step by step outwardly by a restoration signal in the attempt to establish zero track restoration. However, the prior art device involves a problem that zero track restoring motion is repeated as far as it simply refers to the track number of the track counter.

OBJECT OF THE INVENTION

It is therefore an object of the invention to provide a head position re-correcting method which never fails to re-correct the position of a head, referring to a track number of a track counter, and thus overcomes the problems involved in the aforementioned electrical detecting means.

SUMMARY OF THE INVENTION

To attain the object, the invention method of re-correcting the position of a head comprises a zero track restoring means which detects the zero track on disk in view of a difference between the disposition of servo information recorded on an outer guard band on the disk and the disposition of servo information recorded on a data zone on the disk and which electrically controls the head to locate it at the zero track. When a signal for moving the head outwardly is supplied while the track counter indicating the track position of the head demonstrates track number "0" or "1", the zero track restoring means is activated so that the head is controlled to take its position at the zero track and that a zero track signal is supplied for a predetermined duration.

With this arrangement, since the zero track restoring means is activated to produce a zero track signal for a predetermined time when a signal for moving the head outwardly is supplied at track number "0" or "1", the zero track restoring means is activated to never fail to bring the head to a proper position of the zero track when, subsequent to supply of a restoring or similar signal causing the outward movement of the head, the track counter indicates track number "0" or "1" in result of step-by-step movement of the head.

BRIEF DESCRIPTION OF THE DRAWING

The attached drawing is a flow chart of a method of re-correcting the position of a head according to the invention.

DETAILED DESCRIPTION

The invention is described below, referring to a preferred embodiment illustrated in the drawing.

The attached drawing is a flow chart of a method of re-correcting the position of a head according to the invention.

A magnetic disk drive device includes the zero track restoring means formerly proposed by one of the present inventors. When a power source is switched on (a), the zero track restoring means is activated (b) to bring a magnetic head to the zero track on a magnetic disk and also reset a track counter in a drive to indicate track number "0". Further, the zero track restoring means temporarily supplies a zero track signal having a predetermined,, duration, e.g. a signal lasting for several tenths of seconds, which is enough for a controller in the drive to acknowledge that the magnetic head is brought to the zero track. After a predetermined time, the zero track restoring means removes the zero track signal, and instead, supplies a host computer with a seeking completion signal (c) and completes its operation. These operations and other operations explained later are all performed by the controller in the drive.

When a restoring signal etc. is supplied from the host computer to move the magnetic head outwardly, it is judged whether it is a normal mode or buffer mode (e). If it is the buffer mode, operational discrimination (f) follows, based on the present track number of the track counter and the number of steps to move the head, in order to confirm that the destination of the magnetic head is the outer guard band or not. If the destination is the outer guard band, it is meant that a seeking error is present. Therefore, the course to activate the zero track restoring means (b) is selected. If the destination of the head is not the outer guard band but a position in a data zone, the magnetic head is moved (g) by predetermined steps. Further, it is judged whether the head is actually located at the outer guard band or not (h) as a result of the movement of the head by the predetermined number of steps.

When a restoring signal, etc. is supplied from the host computer to move the magnetic head outwardly in the normal mode, it is judged whether the track number of the track counter is "0" (or "1") or not (i). If the track number of the track counter is "0" or "1", the course (b) for activating the zero track restoring means is selected. If the track number of the track counter is other than "0" or "1", the magnetic head is moved outwardly by one step (j), and it is judged again whether the magnetic head is located at the outer guard band or not (h). If the magnetic head is located at the outer guard band, it is meant that a seeking error is present. Therefore, the course (b) for activating the zero track restoring means is selected. If the magnetic head is not located in the outer guard band, it is judged whether the track number of the track counter is "0" or not (k). If the track number is "0", course (c) is taken for producing a zero track signal for a predetermined time and subsequently producing a seeking completion signal. If the track number is not "0", a seeking completion signal is produced (d), and the seeking motion is finished.

According to the aforegoing head position re-correcting method, a zero track signal is supplied for a predetermined time when the zero track restoring means is activated and also when the track number of the track counter becomes "0" as a result of movement of the magnetic head in the buffer mode. After the predetermined time, no zero track signal is produced. When a seeking error is present, causing an inward movement of the magnetic head by several steps in a certain type of magnetic disk drive device, followed by a restoring signal which moves the magnetic head outwardly step by step until the track number of the track counter becomes "1", the zero track restoring means is activated to bring the magnetic head to the zero track and reset the track counter to establish re-correction of the head position.

The aforegoing embodiment has been explained as being applied to a magnetic disk drive device. However, the invention method may be used in any other disk drive device including an electrical zero track restoring means.

As described above, according to the invention method of re-correcting the head position, also when a disk driving device is so arranged that on supply of a zero track signal, it is discriminated whether a seeking error is present or absent, and in presence of a seeking error, the magnetic head is moved inwardly by several steps and thereafter moved outwardly step by step for the purpose of zero track restoration, the device never fails to activate the zero track restoring means when the track number of the track counter becomes "1". Therefore, re-correction of the head position is reliably established.

What is claimed is:

1. A method for recorrecting a position of a head in a recording medium device of a type having a recording medium, a head for reading servo information from the recording medium, head controlling means for controlling movement of the head, a plurality of concentric tracks on the recording medium, one of the tracks being a zero track and a second track being a track one adjacent to the zero track; a track counter for indicating a track position of the head, servo information recorded on the recording medium, including first servo information recorded on a guard band and second servo information recorded on a data zone; and zero track restoring means for detecting the zero track from a difference between a disposition of the first servo information and the second servo information, and for moving the head to the zero track;

the method comprising the steps of:

first, determining if a first condition is true, that the track counter indicates the head is at the zero track or is at the track one, or determining if a second condition is true, that the head is moving outwardly from a center of the recording medium; and next, if either the first or second conditions are determined to be true, activating the zero track restoring means so as to move the head to the zero track and then providing a zero track signal of predetermined duration to the head controlling means.

2. A method of claim 1 wherein said recording medium device is a magnetic disk drive, and said recording medium is a magnetic disk.

* * * * *